United States Patent
Orui

[11] Patent Number: 6,049,601
[45] Date of Patent: Apr. 11, 2000

[54] METHOD OF AND APPARATUS FOR ESTABLISHING CALL FORWARDING SERVICE FOR SUBSCRIBER'S TELEPHONE TERMINAL IN SWITCHING SYSTEM WITH VERIFICATION FUNCTION

[75] Inventor: Takeo Orui, Tokyo, Japan

[73] Assignee: NEC Corporation, Tokyo, Japan

[21] Appl. No.: 08/879,236

[22] Filed: Jun. 19, 1997

[30] Foreign Application Priority Data

Jun. 21, 1996 [JP] Japan ..................................... 8-161740

[51] Int. Cl.⁷ .................................................. H04M 3/54
[52] U.S. Cl. ............................................ 379/211; 379/903
[58] Field of Search ................................... 379/211, 903, 379/207, 201, 210, 212

[56] References Cited

U.S. PATENT DOCUMENTS

| | | | |
|---|---|---|---|
| 5,012,511 | 4/1991 | Hanle et al. | 379/211 |
| 5,077,789 | 12/1991 | Clark, Jr. et al. | 379/211 |
| 5,467,388 | 11/1995 | Redd, Jr. et al. | 379/903 X |
| 5,790,646 | 8/1998 | Moon | 379/211 X |

FOREIGN PATENT DOCUMENTS

| | | | |
|---|---|---|---|
| 63-206055 | 8/1988 | Japan | H04M 1/00 |
| 2-159154 | 6/1990 | Japan | H04M 1/00 |
| 5-136910 | 6/1993 | Japan | H04M 11/00 |
| 5-284233 | 10/1993 | Japan | H04M 3/54 |

*Primary Examiner*—Harry S. Hong
*Attorney, Agent, or Firm*—Sughrue, Mion, Zinn, Macpeak & Seas, PLLC

[57] ABSTRACT

A verification code from a telephone terminal which requests a call forwarding service is registered into a switching system. When a call forwarding service establishing number is dialed from an arbitrary telephone terminal, the arbitrary telephone terminal is prompted to dial the registered verification code and a telephone number thereof. The switching system checks the dialed verification code against the registered verification code. If they coincide with each other, the switching system prompts the arbitrary telephone terminal to dial a call forwarding service establishing special number, the telephone number of the telephone terminal registered in the service and a forwarding destination telephone number, and then establishes a call forwarding service setup for the telephone terminal registered in the service.

13 Claims, 4 Drawing Sheets

METHOD OF AND APPARATUS FOR ESTABLISHING CALL FORWARDING SERVICE FOR SUBSCRIBER'S TELEPHONE TERMINAL IN SWITCHING SYSTEM WITH VERIFICATION FUNCTION

BACKGROUND OF THE INVENTION

1. Field of the Invention

The present invention relates to a method of and apparatus for establishing a call forwarding service in an electronic switching system, and more particularly to a method of and apparatus for establishing a call forwarding setup with respect to incoming calls from a remote region in an electronic switching system.

2. Description of the Related Art

Japanese patent application laid-open No. 5-284233 discloses a process of applying for call forwarding from an external location with a telephone number for receiving call forwarding requests, and remotely changing a telephone number to which incoming calls are to be forwarded, i.e., the forwarding number, and activating and deactivating call forwarding based on the call forwarding application.

Japanese patent application laid-open No. 5-136910 shows a process of providing a call forwarding service in an ISDN communication system to register a forwarding number based on a call forwarding service registering is made from a remote telephone set to which telephone number an incoming call shall be transferred. The disclosed process allows to register the call forwarding service without recognizing the telephone number to which the incoming call is forwarded.

Japanese patent application No. 63-206055 reveals a process of setting a telephone number to which an incoming call shall be forwarded by verifying a received password with a password stored in the telephone.

Japanese patent application laid-open No. 2-159154 shows a process of providing relay contacts in a telephone set by which calls are to be forwarded, from a call circuit to an incoming data transfer circuit, and the relay contacts are switched in response to PB tone signals sent from another telephone set.

The process disclosed in Japanese patent application laid-open No. 5-284233 needs a special device for entering a forwarding number and a password from an external location into a telephone set from which incoming calls are to be forwarded, and cannot use ordinary telephone sets.

The process shown in Japanese patent application laid-open No. 5-136910 is limited to devices capable of handling the ISDN communication processing service. This publication does not disclose any verification function.

The process revealed in Japanese patent application laid-open No. 63-206055 requires an ISDN communication unit in both a telephone set from which incoming calls are to be forwarded and a remote telephone set from which a destination number for forwarding is set, and cannot employ general telephone sets.

SUMMARY OF THE INVENTION

It is therefore an object of the present invention to provide a system capable of establishing a forwarding destination number setting for a telephone terminal from a remote location.

According to the present invention, there is provided a method of establishing a call forwarding service for a subscriber's telephone terminal in a switching system with a verification function, comprising the steps of registering a verification code from a telephone terminal which requests a call forwarding service into a switching system with a verification function, registering a telephone number of the telephone terminal and a forwarding telephone number, to which calls are to be forwarded, based on a result of comparison between a verification code entered with respect to the forwarding telephone number and the registered verification code, indicating the call forwarding service to the telephone terminal, and recognizing the call forwarding service with respect to an incoming call to the telephone terminal, detecting the registered forwarding telephone number, and rerouting the incoming call to the detected forwarding telephone number.

The verification code may comprise an arbitrary numerical value having a predetermined number of figures as determined by a subscriber, or a verification code indicated by the switching system.

The step of registering a forwarding telephone number may comprise the step of registering the forwarding telephone number according to a pushbutton dual-tone multi-frequency dialing.

The switching system may comprise an electronic private branch exchange, and the step of registering a forwarding telephone number comprises the step of registering a forwarding telephone number with a call forwarding service establishing special number of the electronic private branch exchange not only from an extension in the electronic private branch exchange but also from an arbitrary subscriber's telephone terminal connected to a network to which the electronic private branch is connected.

According to the present invention, there is also provided an apparatus for establishing a call forwarding service for a subscriber's telephone terminal in a switching system with a verification function, comprising verification code registering means for registering a verification code transmitted from a telephone terminal which requests a call forwarding service and a telephone number of the telephone terminal, and call forwarding destination number registering means for registering a verification code transmitted with a call made from an arbitrary telephone terminal upon a call forwarding service establishing number in a switching system, the telephone number of the telephone terminal, and a forwarding telephone number, to which calls are to be forwarded, based on a result of comparison between the transmitted verification code and the registered verification code, and indicating the call forwarding service to the telephone terminal, whereby the call forwarding service with respect to an incoming call to the telephone terminal is recognized, the registered forwarding telephone number is detected, and the call is rerouted to the detected forwarding telephone number.

The switching system may comprise an electronic private branch exchange, and the telephone terminal may comprise an extension telephone terminal of the electronic private branch exchange. The apparatus may further comprise verification code registering means for registering a verification code requested by the extension telephone terminal and corresponding to the extension telephone terminal, in the electronic private branch exchange, means for, when a call forwarding service establishing special number in the electronic private branch exchange is dialed from any of telephone terminals in the electronic private branch exchange or a public telephone network, prompting any of the telephone terminals to dial the registered verification code and a telephone number of the extension telephone terminal registered in the service, and storing the verification code and the telephone number of the extension telephone terminal, checking means for determining whether the registered verification code and the dialed verification code agree with each other or not, and forwarding number registering means for, if the registered verification code and the dialed verification code coincide with each other, prompting the telephone terminals to dial a call forwarding service establishing setting number, the telephone number of the extension telephone terminal, and a forwarding number, and establishing a call forwarding service for the extension telephone terminal from the call forwarding service establishing number, the telephone number of the extension telephone terminal, and the forwarding number.

The verification code may comprise an arbitrary numerical value having a predetermined number of figures as determined by a subscriber or an extension user or a verification code indicated by the switching system.

The above and other objects, features, and advantages of the present invention will become apparent from the following description with references to the accompanying drawings which illustrate an example of the present invention.

DETAILED DESCRIPTION OF THE PREFERRED EMBODIMENT

Figure 1:
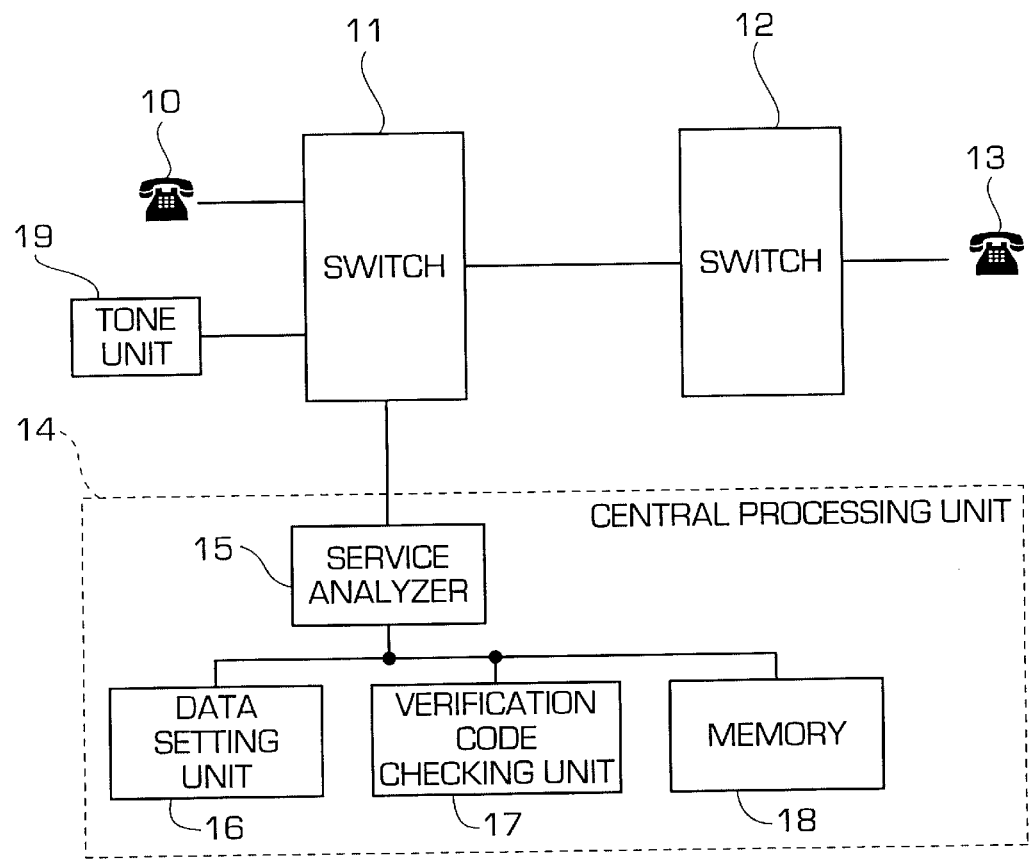
FIG. 1 is a block diagram of a call forwarding system with a verification function according to the present invention.

FIG. 1 shows a block diagram of a call forwarding system with a verification function according to the present invention. As shown in FIG. 1, the call forwarding system, which may be incorporated in an electronic private branch exchange, has a switch 11 to which there are connected a telephone set 10 and a tone unit 19 and which is controlled by a central processing unit 14.

The central processing unit 14 comprises a service analyzer 15, a data setting unit 16, a verification code checking unit 17, and a memory 18. A remotely located switch 12 is connected to the switch 11 through a dedicated line or a public network. A telephone set 13 is connected to the remotely located switch 12. The telephone sets 10, 13 may comprise push-button dialing telephone sets with DTMF (dual-tone multifrequency dialing).

The service analyzer 15 analyzes numerals entered from a telephone set, sends various tones corresponding to the analysed result of numerals from the tone unit 19 to the telephone set, instructs the data setting unit 16 to write data into the memory 18, and instructs the verification code checking unit 17 to check received code against the code stored in the memory 18.

Instructed by the service analyzer 15, the data setting unit 16 writes a verification code and a telephone from which a call is to be forwarded, which have been entered from the telephone set, into the memory 18.

Instructed by the service analyzer 15, the verification code checking unit 17 checks a verification code entered from a telephone set against the data stored in the memory 18.

The table given below is a call forwarding data table showing the data stored in the memory 18. The call forwarding data table contains data representing verification codes and forwarding destination telephone numbers (forwarding numbers) with respect to telephone numbers from which calls are to be forwarded.

TABLE

| Telephone number | Verification code | Forwarding number |
|---|---|---|
| 826-2000 | 123456 | 810-3000 |

Operation of the call forwarding system will be described in detail below.

Figure 2:
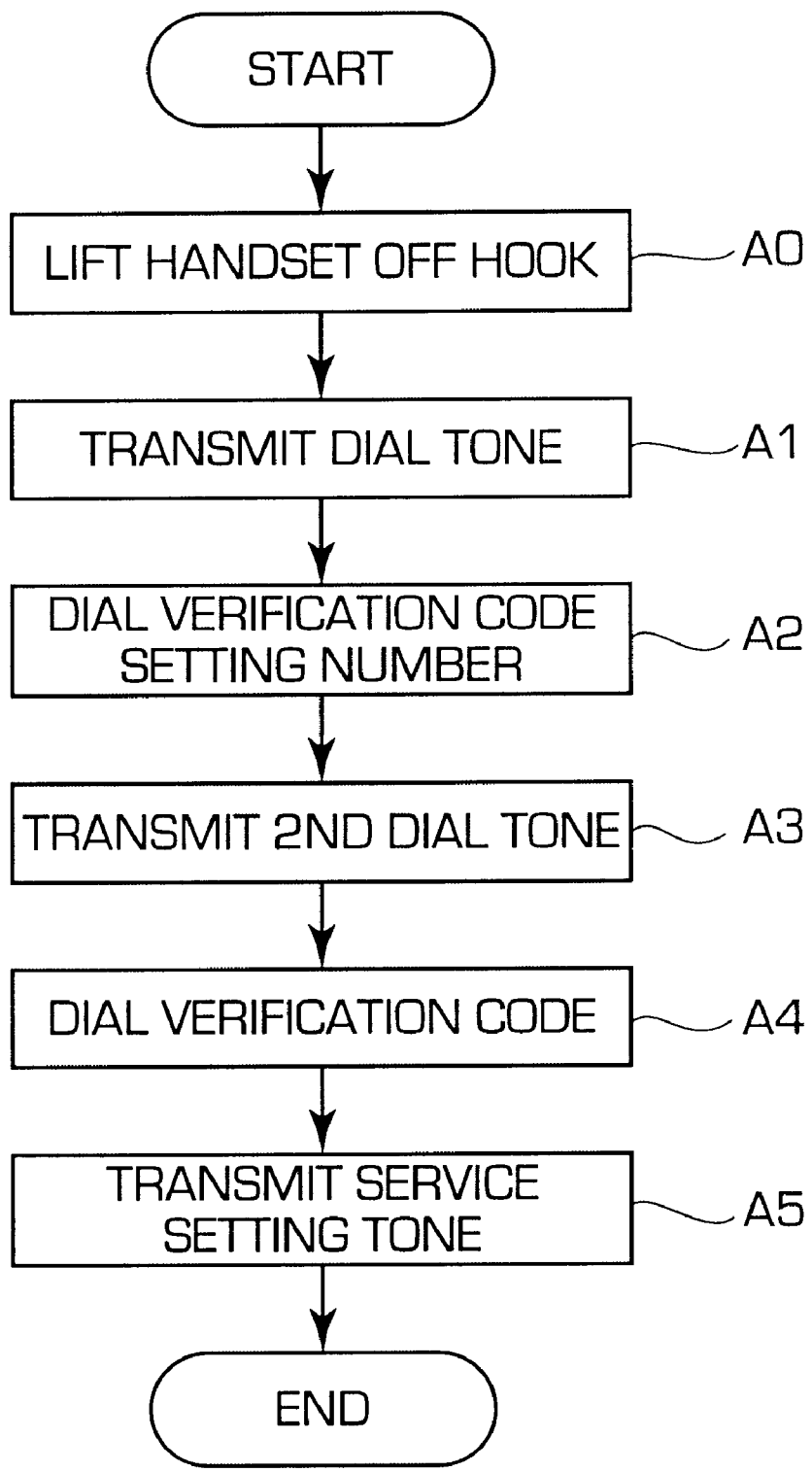
FIG. 2 is a flowchart of an operation sequence for establishing a verification code from a user's own telephone set.

FIG. 2 shows an operation sequence for establishing a verification code from a user's own telephone set 10 in FIG. 1, which has a telephone number 816-2000 (extension: 2000). When the handset of the telephone set 10 is lifted off the hook in a step A0, the service analyzer 15 instructs the tone unit 19 to transmit a dial tone in a step A1. When a verification code setting number 70 is dialed from the telephone set 10 in a step A2, the service analyzer 15 instructs the tone unit 19 to transmit a second dial tone in a step A3. In response to the second dial tone, the user dials a verification code 123456 from the telephone set 10 in a step A4. The service analyzer 15 instructs the data setting unit 16 to write the verification code 123456 into a verification code area corresponding to the telephone number 826-2000 in the call forwarding data table in the memory 18. Then, the service analyzer 15 instructs the data setting unit 16 to transmit a service setting tone indicating that the setting of the verification code is completed in a step A5.

Figure 3:
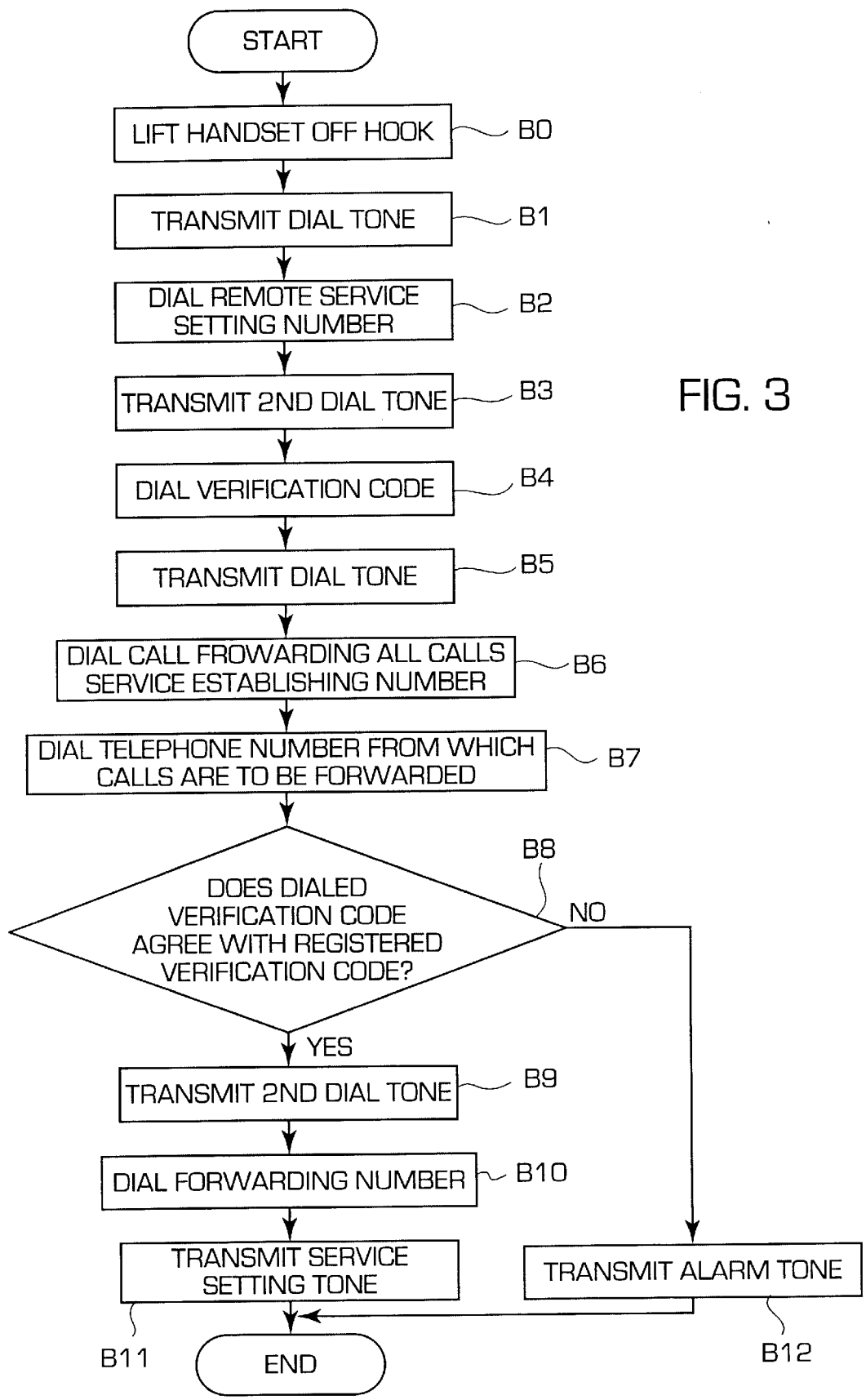
FIG. 3 is a flowchart of an operation sequence for setting a forwarding destination number from a remotely located telephone set.

FIG. 3 shows an operation sequence for setting a forwarding number for a call forwarding to the user's own telephone set 10 from the remotely located other telephone set 13. It is assumed that the user has moved from the user's own telephone set 10 to the telephone set 13, but has not yet established a forwarding number with respect to the user's own telephone set 10. It is also assumed that the user's own telephone set 10 has a telephone number 826-2000 with 826 being an access code of the switch 11, and the remotely located telephone set 13 has a telephone number 810-3000 with 810 being an access code of the switch 12. When the handset of the telephone set 13 is lifted off the hook in a step B0, the service analyzer 15 instructs the tone unit 19 to transmit a dial tone in a step B1. When a remote service setting number 82672 of the switch 11 is dialed from the telephone set 13 in a step B2, the service analyzer 15 instructs the tone unit 19 to transmit a second dial tone in a step B3, setting up a path between the remotely located telephone set 13 and the switch 11. When the verification code 123456 is dialed from the telephone set 13 in a step B4, the service analyzer 15 instructs the tone unit 19 to transmit a dial tone in a step B5. When a call forwarding all calls service establishing number 74 and the telephone number 826-2000 are dialed in steps B6, B7, the service analyzer 15 instructs the verification code checking unit 17 to check the verification code 123456. The verification code checking unit 17 determines whether the verification code 123456 dialed in the step B4 agrees with the verification code 123456 corresponding to the telephone number 826-2000 in the call forwarding data table in the memory 18 in a step B8, and transmits the result to the service analyzer 15. If the verification code 123456 coincides with the data in the call forwarding data table, then the service analyzer 15 instructs the tone unit 19 to transmit a second dial tone prompting the user to enter a forwarding number in a step B9. If the verification code 123456 does not coincide with the data in the call forwarding data table, then the service analyzer 15 instructs the tone unit 19 to transmit an alarm tone in a step B12. When the forwarding number 810-3000 is dialed from the telephone set 13 in a step B10, the service analyzer 15 instructs the tone unit 19 to transmit a service setting tone indicating that the setting of the forwarding number 810-3000 is completed in a step B11, and instructs the data setting unit 16 to set the forwarding number 810-3000. The data setting unit 16 then writes the telephone number 810-3000 in a forwarding number area corresponding to the telephone number 826-2000 in the call forwarding data table. The operation sequence for setting the forwarding number for a call forwarding all calls service for the telephone set 10 from the telephone set 13 is now completed.

Figure 4:
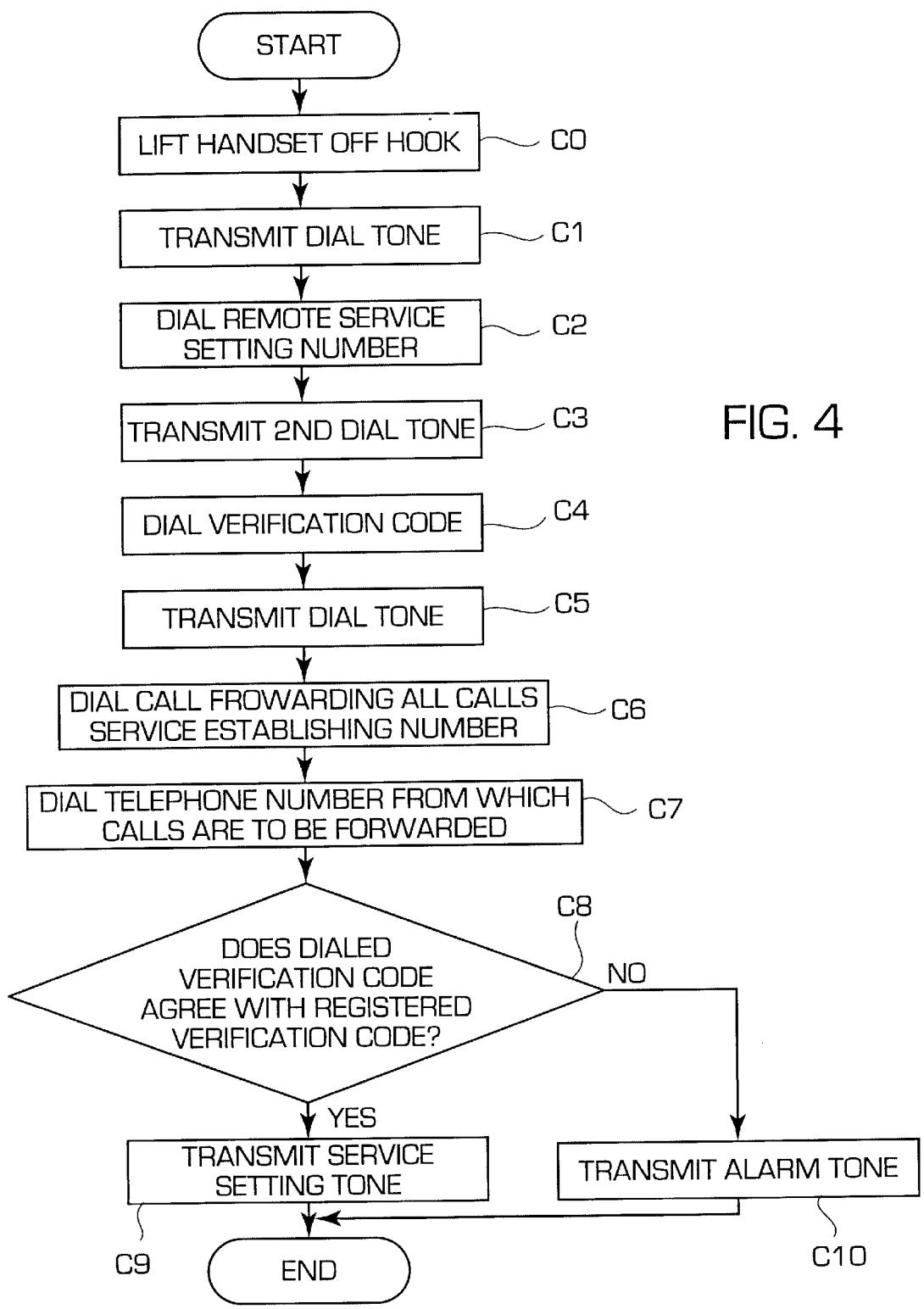
FIG. 4 is a flowchart of an operation sequence for canceling the call forwarding operation from the remotely located other telephone set.

FIG. 4 shows an operation sequence for canceling the call forwarding service which has been set for the user's own telephone set 10, from the remotely located telephone set 13. The operation sequence for canceling a call forwarding service which has already been set for the user's own telephone set 10 is required when the user further moves from the telephone set 13. When the handset of the telephone set 13 is lifted off the hook in a step C0, the service analyzer 15 instructs the tone unit 19 to transmit a dial tone in a step C1. When the remote service setting number 82672 of the switch 11 is dialed from the telephone set 13 in a step C2, the service analyzer 15 instructs the tone unit 19 to transmit a second dial tone in a step C3, setting up a path between the remotely located telephone set 13 and the switch 11. When the verification code 123456 is dialed from the telephone set 13 in a step C4, the service analyzer 15 instructs the tone unit 19 to transmit a dial tone in a step C5. When a call forwarding service canceling number 76 and the telephone number 826-2000 are dialed in steps C6, C7, respectively, the service analyzer 15 instructs the verification code checking unit 17 to check the verification code 123456. The verification code checking unit 17 determines whether the verification code 123456 dialed in the step C4 coincides with the verification code 123456 corresponding to the telephone number 826-2000 in the call forwarding data table in the memory 18 in a step C8, and transmits the result to the service analyzer 15. If the verification code 123456 coincides with the data in the call forwarding data table, then the service analyzer 15 instructs the tone unit 19 to transmit a service setting tone indicating that the canceling of the call forwarding service is completed in a step C9, and instructs the data setting unit 16 to cancel the call forwarding service. If the verification code 123456 does not coincide with the code in the call forwarding data table, then the service analyzer 15 instructs the tone unit 19 to transmit an alarm tone in a step C10.

The call forwarding system according to the present invention is applicable to another call forwarding service, e.g., a call forwarding for busy line service or a call forwarding for no answer service. In such a modification, a call forwarding service setting number corresponding to such another call forwarding service may be used in the step B6 shown in FIG. 3 or the step C6 shown in FIG. 4, and the data of a forwarding number for such another call forwarding service is stored in the call forwarding data table.

According to still another modification, a remotely located telephone set for setting a call forwarding service may be a telephone set in a public telephone network rather than a telephone set in a private telephone network. In such a modification, the corresponding special number of public telephone network ('dial in number) is dialed for remote setting of a call forwarding service in step B2 of remote setting procedure and in step C2 of canceling procedure.

While a preferred embodiment of the present invention has been described using specific terms, such description is for illustrative purposes only, and it is to be understood that changes and variations may be made without departing from the spirit or scope of the following claims.

What is claimed is:

1. A method of establishing a call forwarding service for a subscriber's telephone terminal in a switching system with a verification function, comprising the steps of:

automatically recognizing a telephone number of a telephone terminal to which a call forwarding service with a verification function is established and registering a verification code sent from said telephone terminal to which a call forwarding service with a verification function is established after said telephone number is automatically recognized;

registering said automatically recognized telephone number of said telephone terminal requesting the call forwarding service and a call forwarding destination telephone number, to which incoming calls are to be forwarded, based on a confirmation of coincidence between a verification code entered with respect to the call forwarding destination telephone number and the registered verification code;

indicating the call forwarding service for said telephone terminal registered in the service; and recognizing the call forwarding service with respect to an incoming call to said telephone terminal in the service, detecting the registered call forwarding destination telephone number, and rerouting the call to the detected call forwarding destination telephone number.

2. A method according to claim 1, wherein said verification code comprises an arbitrary numerical value having a predetermined number of figures as determined by a subscriber.

3. A method according to claim 1, wherein said verification code comprises a verification code indicated by said switching system.

4. A method according to claim 1, wherein said step of registering a call forwarding destination telephone number comprises the step of registering the forwarding destination telephone number according to a pushbutton dual-tone multifrequency dialing dialed from any arbitrary telephone connectable to the switching system to control the call forwarding service.

5. A method according to claim 1, wherein said switching system comprises an electronic private branch exchange, and said step of registering a call forwarding destination telephone number comprises a step of dialing the call forwarding service establishing request special number of the electronic private branch exchange from one of an extension in the electronic private branch exchange and an arbitrary subscriber's telephone terminal connected to a telephone network to which the electronic private branch is connected.

6. The method of claim 1, wherein the step of registering a verification code registers the verification code by replacing a previously registered verification code.

7. An apparatus for establishing a call forwarding service with verification function for a subscriber's telephone terminal in a switching system, comprising:

means for automatically recognizing a telephone number of a telephone terminal which requests a call forwarding service;

verification code registering means for registering a verification code transmitted from said telephone terminal which requests a call forwarding service and said telephone number of said telephone terminal; and call forwarding number registering means for registering a telephone number requesting a call forwarding service and a call forwarding destination telephone number transmitted from an arbitrary telephone terminal by dialing a call-forwarding number establishing special number of a corresponding switching system after confirmation of coincidence of the verification code, and indicating the call forwarding service to said telephone terminal requesting the service;

whereby when an incoming call is recognized by said indication of call forwarding number registering means as a call to a terminal to which a call forwarding setup is established, the registered call forwarding destination telephone number is detected, and the call is rerouted to the detected forwarding destination telephone number.

8. An apparatus for establishing a call forwarding service for a subscriber telephone terminal in a switching system, wherein said switching system includes an electronic private branch exchange and extension telephone terminals, the apparatus comprising:

means for automatically recognizing a telephone number of one of the extension terminals which requests a call forwarding service;

verification code registering means for registering a verification code transmitted from said one of the extension telephone terminals which requests the call forwarding service;

means for, when a call forwarding service establishing special number of the electronic private branch exchange is dialed from one of telephone terminals in the electronic private branch exchange or a public telephone network, prompting said one of said telephone terminals to dial the registered verification code and said telephone number of said extension telephone terminal which requests the call forwarding service into the service, and storing the dialed verification code and the telephone number of said extension telephone terminal in the service;

checking means for determining whether or not said dialed verification code coincides with the registered verification code; and call forwarding number registering means for, if said registered verification code and the dialed verification code coincide with each other, prompting said one of said telephone terminals to dial a call forwarding number setting special number, said telephone number registered in the call forwarding service, and a call forwarding destination number, and establishing a call forwarding service setup for the extension telephone terminal registered in the call forwarding service by storing the call forwarding destination number.

9. An apparatus according to claim 7 or 8, wherein said verification code comprises an arbitrary numerical value having a predetermined number of figures as determined by a subscriber and an extension user.

10. An apparatus according to claim 7 or 8, wherein said verification code comprises a verification code indicated by said switching system.

11. The apparatus of claim 7, wherein said verification code registering means registers the verification code by replacing a previously registered verification code.

12. An apparatus for establishing a call forwarding service with verification function for a subscriber's telephone terminal in a switching system, comprising:

a unit which automatically recognizes a telephone number of a telephone terminal which requests a call forwarding service;

a verification code registering unit which registers a verification code transmitted from said telephone terminal which requests a call forwarding service and said telephone number of said telephone terminal; and a call forwarding number registering unit which registers a telephone number requesting a call forwarding service and a call forwarding destination telephone number transmitted from an arbitrary telephone terminal by dialing a call-forwarding number establishing special number of a corresponding switching system after confirmation of coincidence of the verification code, and indicating the call forwarding service to said telephone terminal requesting the service;

whereby when an incoming call is recognized by said indication of said call forwarding number registering unit as a call to a terminal to which a call forwarding setup is established, the registered call forwarding destination telephone number is detected, and the call is rerouted to the detected forwarding destination telephone number.

13. An apparatus for establishing a call forwarding service for a subscriber telephone terminal in a switching system, wherein said switching system includes an electronic private branch exchange and extension telephone terminals, the apparatus comprising:

a unit which automatically recognizes a telephone number of one of the extension terminals which requests a call forwarding service;

a verification code registering unit for registering a verification code transmitted from said one of the extension telephone terminals which requests the call forwarding service;

a unit which, when a call forwarding service establishing special number of the electronic private branch exchange is dialed from one of telephone terminals in the electronic private branch exchange or a public telephone network, prompts said one of said telephone terminals to dial the registered verification code and said telephone number of said extension telephone terminal which requests the call forwarding service into the service, and stores the dialed verification code and the telephone number of said extension telephone terminal in the service;

a checker which determines whether or not said dialed verification code coincides with the registered verification code; and a call forwarding number registering unit which, if said registered verification code and the dialed verification code coincide with each other, prompts said one of said telephone terminals to dial a call forwarding number setting special number, said telephone number registered in the call forwarding service, and a call forwarding destination number, and establishes a call forwarding service setup for the extension telephone terminal registered in the call forwarding service by storing the call forwarding destination number.

* * * * *

UNITED STATES PATENT AND TRADEMARK OFFICE
CERTIFICATE OF CORRECTION

PATENT NO. : 6,049,601
DATED : April 11, 2000
INVENTOR(S) : Takeo Orui

Page 1 of 1

It is certified that error appears in the above-identified patent and that said Letters Patent is hereby corrected as shown below:

Column 4,
line 22 delete "816" insert --826--

Signed and Sealed this

Twenty-sixth Day of June, 2001

Attest:

NICHOLAS P. GODICI
Attesting Officer    Acting Director of the United States Patent and Trademark Office